(12) United States Patent
Yamanaka et al.

(10) Patent No.: US 12,737,677 B2
(45) Date of Patent: Sep. 15, 2026

(54) DETERMINATION DEVICE, DETERMINATION METHOD, AND DETERMINATION PROGRAM

(71) Applicant: NTT, Inc., Tokyo (JP)

(72) Inventors: Yuki Yamanaka, Tokyo (JP); Naoto Fujiki, Tokyo (JP); Masanori Shinohara, Tokyo (JP)

(73) Assignee: NTT, Inc., Tokyo (JP)

( * ) Notice: Subject to any disclaimer, the term of this patent is extended or adjusted under 35 U.S.C. 154(b) by 783 days.

(21) Appl. No.: 18/026,345

(22) PCT Filed: Sep. 18, 2020

(86) PCT No.: PCT/JP2020/035622
§ 371 (c)(1),
(2) Date: Mar. 14, 2023

(87) PCT Pub. No.: WO2022/059207
PCT Pub. Date: Mar. 24, 2022

(65) Prior Publication Data
US 2023/0351251 A1 Nov. 2, 2023

(51) Int. Cl.
*G06N 20/00* (2019.01)

(52) U.S. Cl.
CPC .................................... *G06N 20/00* (2019.01)

(58) Field of Classification Search
CPC ........ G06N 20/00; G06N 3/0455; G06N 3/08; G06N 3/047; G06F 21/55; H04L 63/1416
See application file for complete search history.

(56) References Cited

U.S. PATENT DOCUMENTS

2012/0054184 A1* 3/2012 Masud .................. G06F 16/285 707/E17.091
2019/0081969 A1* 3/2019 Phadke ............... H04L 63/1416
2019/0385082 A1 12/2019 Kameda
2020/0151619 A1 5/2020 Mopur et al.
2020/0280578 A1* 9/2020 Hearty ................ H04L 63/1433
2020/0401497 A1 12/2020 Saeki et al.
(Continued)

FOREIGN PATENT DOCUMENTS

JP 2019153893 A 9/2019
JP 2019220866 A 12/2019
(Continued)

OTHER PUBLICATIONS

Pears R, Sakthithasan S, Koh YS. Detecting concept change in dynamic data streams: A sequential approach based on reservoir sampling. Machine learning. Dec. 2014;97(3):259-93. (Year: 2014).*
(Continued)

*Primary Examiner* — Oluwatosin Alabi

(57) ABSTRACT

A determination unit determines necessity of relearning of an initial learning model based on at least one of information regarding the initial learning model generated by learning initial learning data known to be normal, information regarding over-detection data over-detected by an abnormality detection system that uses the initial learning model, and information regarding an over-detection model generated based on the over-detection data. A notification unit notifies of determination result by determination unit.

7 Claims, 6 Drawing Sheets

(56) References Cited

U.S. PATENT DOCUMENTS

| | | | | |
|---|---|---|---|---|
| 2021/0256402 | A1 | 8/2021 | Yamanaka | |
| 2022/0027750 | A1* | 1/2022 | Poli | G06N 20/00 |
| 2022/0156634 | A1* | 5/2022 | Margolin | G06N 20/00 |
| 2022/0188694 | A1* | 6/2022 | Suzani | G06N 3/045 |

FOREIGN PATENT DOCUMENTS

| | | | |
|---|---|---|---|
| JP | 2020123174 | A | 8/2020 |
| WO | 2018143019 | A1 | 8/2018 |
| WO | 2020/078818 | A1 | 4/2020 |

OTHER PUBLICATIONS

Yang et al. (2020) "A Novel Concept Drift Detection Method for Incremental Learning in Nonstationary Environments" IEEE Transactions on Neural Networks and Learning Systems, IEEE, USA, vol. 31, No. 1, Jan. 1, 2020, pp. 309-320.

Pesaranghader et al. (2017) "McDiarmid Drift Detection Methods for Evolving Data Streams" arxiv.org, Cornell University Library, 201 Olin Library Cornell University Ithaca, NY 14853, Oct. 5, 2017 (Oct. 5, 2017), XP080826382.

Gama et al. (2013) "A Survey on Concept Drift Adaptation" ACM Computing Surveys, vol. 1, No. 1, Article 1 [online] Accessed on Apr. 24, 2024, website: https://www.win.tue.nl/-mpechen/publications/pubs/Gama_ACMCS_AdaptationCD_accepted.pdf.

* cited by examiner

Fig. 1

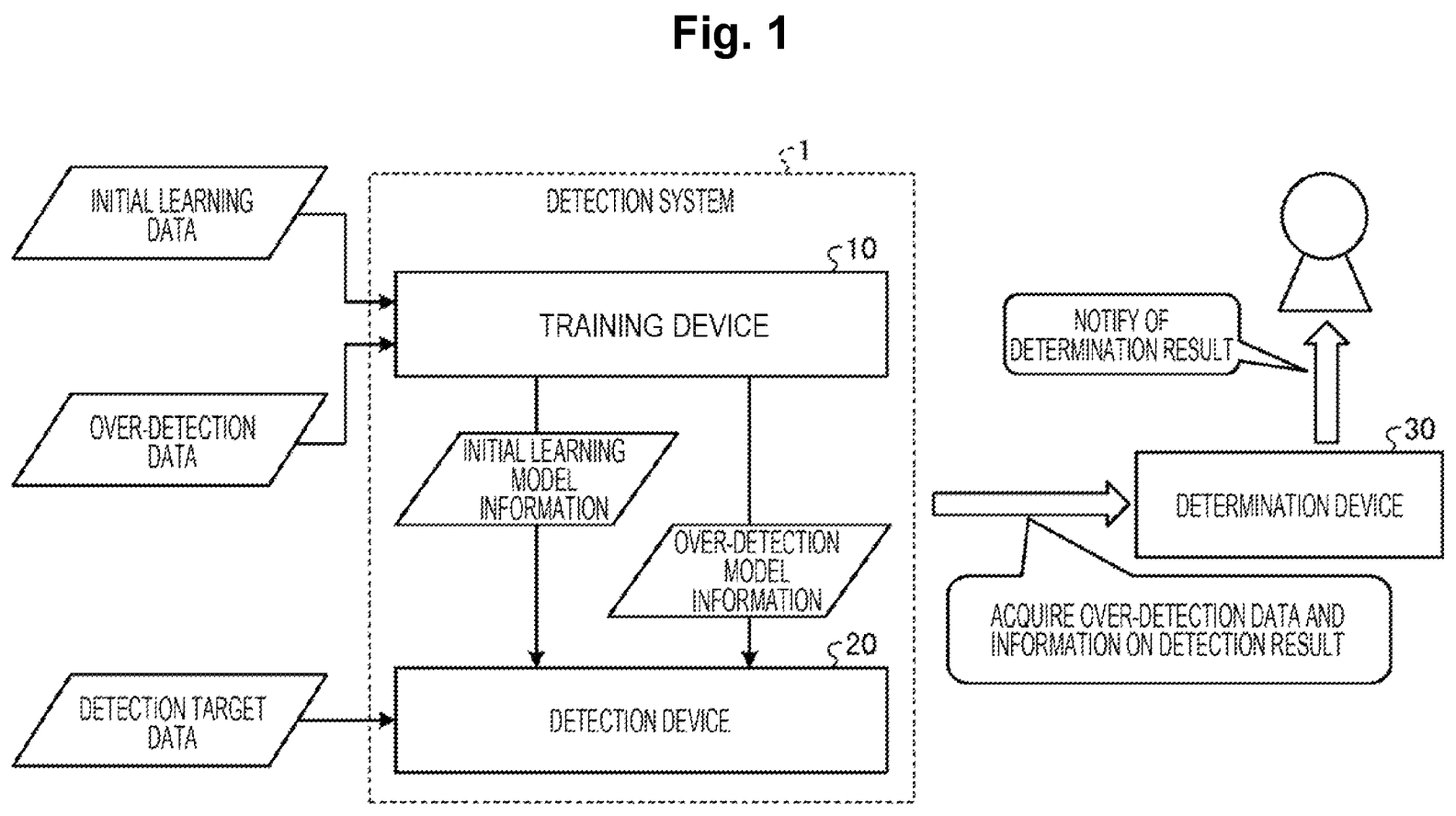

INITIAL LEARNING DATA
OVER-DETECTION DATA
DETECTION TARGET DATA
1
DETECTION SYSTEM
10
TRAINING DEVICE
INITIAL LEARNING MODEL INFORMATION
OVER-DETECTION MODEL INFORMATION
20
DETECTION DEVICE
ACQUIRE OVER-DETECTION DATA AND INFORMATION ON DETECTION RESULT
30
DETERMINATION DEVICE
NOTIFY OF DETERMINATION RESULT

DETERMINATION DEVICE, DETERMINATION METHOD, AND DETERMINATION PROGRAM

CROSS-REFERENCE TO RELATED APPLICATIONS

This application is a U.S. National Stage Application filed under 35 U.S.C. § 371 claiming priority to International Patent Application No. PCT/JP2020/035622, filed on 18 Sep. 2020, the disclosure of which is hereby incorporated herein by reference in its entirety.

TECHNICAL FIELD

The present invention relates to a determination device, a determination method, and a determination program.

BACKGROUND ART

With the advent of the IoT era, a wide variety of devices are now being connected to the Internet for a wide variety of uses. In recent years, traffic session abnormality detection systems and intrusion detection systems (IDSs) for IoT devices have been actively studied as security countermeasures for IoT devices.

Some of such abnormality detection systems use probability density estimators based on unsupervised learning such as variational auto encoders (VAEs). An abnormality detection system using a probability density estimator can estimate the occurrence probability of a normal communication pattern by generating high dimensional data for learning called a traffic feature amount from actual communication and learning a feature of normal traffic using the feature amount. In the following description, the probability density estimator may be simply referred to as a model.

Thereafter, the abnormality detection system calculates an occurrence probability of each communication using a learned model and detects a communication with a small occurrence probability as an abnormality. Therefore, according to the abnormality detection system using the probability density estimator, there is the advantage that it is possible to detect an abnormality without knowing all the malicious states and it is also possible to handle an unknown cyber-attack. In the abnormality detection system, an anomaly score that is larger as the above-described occurrence probability is smaller may be used to detect an abnormality in some cases.

It can be said that an abnormality detection system using a probability density estimator detects an abnormality based on the degree of deviation of a detection target from a normal state. Therefore, when a tendency of normal data of a monitoring target system changes, it is necessary to cause the probability density estimator to track the change.

As a scheme of tracking a change in a normal state, over-detection feedback (FB) and relearning are known (see, for example, Patent Literature 1). Over-detection FB is a method of correcting a small deviation from a learned model. As the name indicates, relearning is a method of discarding a currently kept learned model and newly performing learning.

CITATION LIST

Patent Literature

Patent Literature 1: JP 2019-220866 A

SUMMARY OF INVENTION

Technical Problem

In the technology of the related art, however, there is a problem that it may be difficult to appropriately select a scheme for tracking a change in a normal state.

For example, the over-detection FB is a powerful scheme. When a change from a learned model is small, the over-detection FB may be basically used. However, the over-detection FB may not function well, for example, when a large number of new normal patterns are subjected to FB or there is a significant change in a tendency from the learned model.

On the other hand, in order to determine a case where the over-detection FB does not function well, deep knowledge of machine learning is required. Therefore, not all users can appropriately select schemes of tracking changes in normal states.

Solution to Problem

In order to solve the above-described problems and achieve an objective, a determination device includes: a determination unit configured to determine necessity of relearning of a first model based on at least one of information regarding the first model generated by learning normal data, information regarding over-detection data over-detected by an abnormality detection system that uses the first model, and information regarding a second model generated based on the over-detection data; and a notification unit configured to notify of a result of the determination by the determination unit.

Advantageous Effects of Invention

According to the present invention, it is possible to appropriately select a scheme of tracking a change in a normal state.

BRIEF DESCRIPTION OF DRAWINGS

FIG. 1 is a diagram illustrating a relationship between a determination device and a detection system.

DESCRIPTION OF EMBODIMENTS

Hereinafter, embodiments of a determination device, a determination method, and a determination program according to the present application will be described in detail with reference to the drawings. The present invention is not limited to the embodiments to be described below.

[Configuration of First Embodiment]

FIG. 1 is a diagram illustrating a relationship between a determination device and a detection system. As illustrated in FIG. 1, a determination device 30 acquires over-detection data and information on a detection result from a detection system 1, performs determination based on the acquired information, and notifies a user of a determination result.

The detection system 1 includes a training device 10 and a detection device 20. The training device 10 learns a model using initial learning data and passes initial learning model information, which is information for constructing a learned model, to the detection device 20. For example, the model is a probability density estimator such as a VAE.

The training device 10 learns the model using over-detection data and passes over-detection model information which is information for constructing the learned model to the detection device 20. The detection device 20 constructs each model based on the information received from the training device 10 and detects an abnormality of detection target data.

The detection system 1 may have a configuration and a function similar to those of an evaluation device described in Patent Literature 1. In that case, the training device 10 is relevant to a generation unit in an evaluation device described in Patent Literature 1. The detection device 20 is relevant to an evaluation unit in the evaluation device described in Patent Literature 1.

The over-detection data is data that is determined to be abnormal in the initial learning model learned using the initial learning data but that should be normal. A model that performs learning using only over-detection data is an over-detection model. Over-detection FB is a scheme of using both the initial learning model and the over-detection model (for details, see Patent Literature 1).

Here, a mechanism using both the initial learning model and the over-detection model is referred to as a detection engine. The detection engine calculates an anomaly score in both the initial learning model and the over-detection model for input evaluation target data. The detection engine regards a smaller score between two anomaly scores as a final anomaly score. The detection engine can approximately regard logsumexp of the two anomaly scores as a smallest value.

Figure 2:
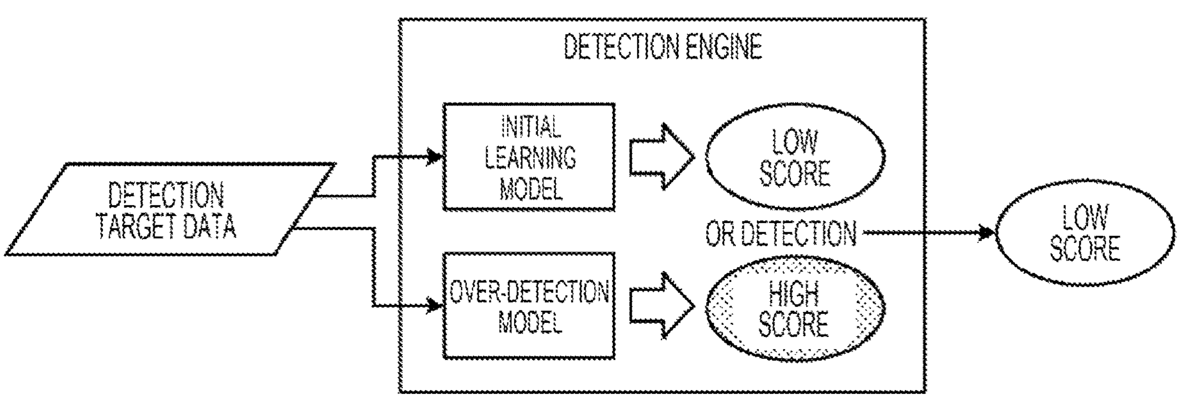
FIG. 2 is a diagram illustrating an exemplary operation of a detection engine.

For example, as illustrated in FIG. 2, when the initial learning model calculates a low score and the over-detection model calculates a high score, the detection engine outputs the low score as the final anomaly score. FIG. 2 is a diagram illustrating an exemplary operation of the detection engine.

Figure 3:
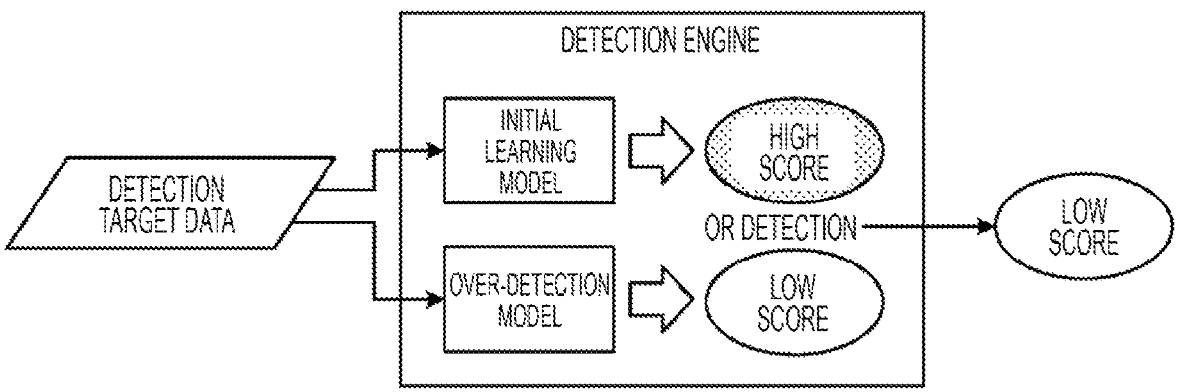
FIG. 3 is a diagram illustrating an exemplary operation of the detection engine.

For example, as illustrated in FIG. 3, when the initial learning model calculates a high score and the over-detection model calculates a low score, the detection engine outputs the lower score as the final anomaly score. FIG. 3 is a diagram illustrating an exemplary operation of the detection engine.

The detection engine may use not only one over-detection model but also a plurality of over-detection models together with the initial learning model. When the number of over-detection models is plural, the number of over-detection models+one anomaly score is calculated for one piece of evaluation target data by each model. The detection engine regards the smallest anomaly score among the plurality of anomaly scores as the final anomaly score.

Here, there are two concerns with the over-detection FB. The first concern is that, since the over-detection model is a model of a smaller scale than the initial learning model, there is a limit to patterns of data that can be learned. Accordingly, when FB is attempted on a large number of patterns at a time, the over-detection model may not learn all the over-detection data well, and the FB may not operate well.

The second concern is that a plurality of over-detection models can be used together, as described above. However, when the number of over-detection models excessively increases, the risk of detection omission in which originally abnormal data is erroneously regarded as normal may increase. Basically, an initial learning model and an over-detection model preferably have a relationship in which the initial learning model can successfully reflect a normal state, and the over-detection model absorbs a subtle difference between the initial learning model and the normal state.

Here, when relearning is performed, it is necessary to collect new learning data. For this reason, relearning can be said to be a scheme that has a large effect and requires considerably large cost. Therefore, when the over-detection FB is sufficient, it is preferable to adopt the over-detection FB. On the other hand, since the over-detection FB has the foregoing concerns, there are cases where it is better not to adopt the over-detection FB.

Accordingly, in the present embodiment, the determination device 30 automatically determines whether the relearning is adopted or the over-detection FB is adopted, based on predetermined information, and notifies the user of a result. As a result, according to the present embodiment, it is possible to appropriately select a scheme of tracking a change in a normal state.

Figure 4:
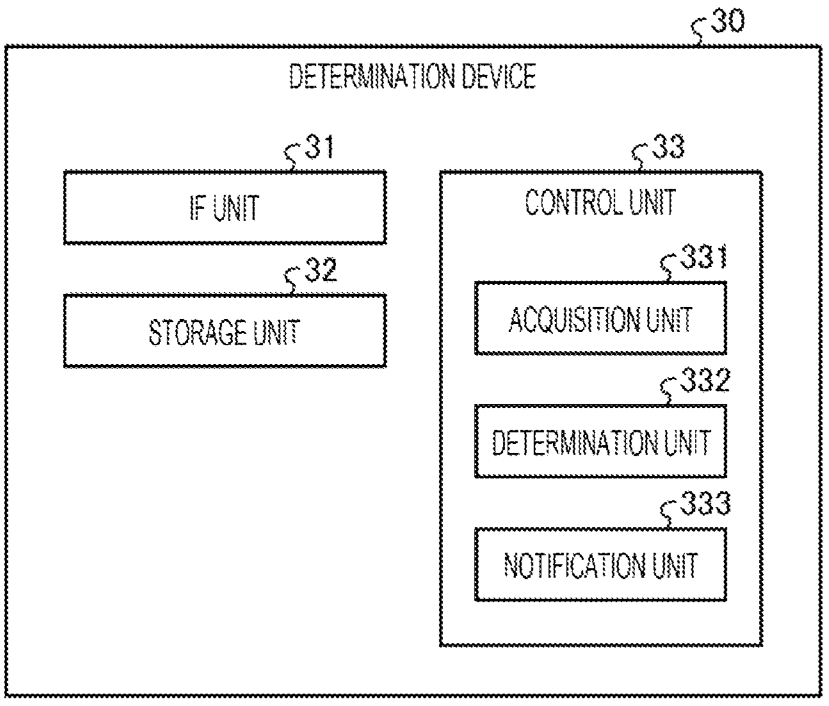
FIG. 4 is a diagram illustrating an exemplary configuration of a determination device according to a first embodiment.

The determination device 30 will be described with reference to FIG. 4. FIG. 4 is a diagram illustrating an exemplary configuration of the determination device according to the first embodiment. As illustrated in FIG. 4, the determination device 30 includes an interface (IF) unit 31, a storage unit 32, and a control unit 33.

The IF unit 31 is an interface for inputting and outputting data. For example, the IF unit 31 is a network interface card (NIC). The IF unit 31 may be connected to an input device such as a mouse or a keyboard and an output device such as a display.

The storage unit 32 is a storage device such as a hard disk drive (HDD), a solid state drive (SSD), or an optical disc. The storage unit 32 may be a semiconductor memory capable of rewriting data, such as a random access memory (RAM), a flash memory, or a nonvolatile static random access memory (NVSRAM). The storage unit 32 stores an operating system (OS) and various programs executed by the determination device 30.

The control unit 33 controls the entire determination device 30. The control unit 33 includes, for example, an electronic circuit such as a central processing unit (CPU), a micro processing unit (MPU), or a graphics processing unit (GPU), or an integrated circuit such as an application specific integrated circuit (ASIC) or a field programmable gate array (FPGA). The control unit 33 includes an internal memory storing programs and control data defining various processing procedures and performs each procedure using the internal memory. Furthermore, the control unit 33 functions as various processing units by various programs operating. For example, the control unit 33 includes an acquisition unit 331, a determination unit 332, and a notification unit 333.

The acquisition unit 331 acquires information necessary for the determination from detection system 1. For example, the acquisition unit 331 acquires at least one of information regarding the initial learning model generated by learning the initial learning data known to be normal, information regarding over-detection data over-detected by the abnormality detection system using the initial learning model, and information regarding the over-detection model generated based on the over-detection data. The initial learning model is an example of a first model. The over-detection model is an example of a second model.

For example, the acquisition unit 331 acquires numbers, types, specific values, and the like of the initial learning data and the over-detection data. The acquisition unit 331 acquires a value of a loss function, a calculated anomaly score, and the like regarding the initial learning model and the over-detection model.

The determination unit 332 determines necessity of the relearning based on the information acquired by the acquisition unit 331. That is, the determination unit 332 determines the necessity of the relearning of the initial learning model based on at least one of the information regarding the initial learning model generated by learning the initial learning data known to be normal, the information regarding the over-detection data over-detected by the abnormality detection system using the initial learning model, and the information regarding the over-detection model generated based on the over-detection data.

The notification unit 333 notifies of a determination result of the determination unit 332. The notification unit 333 notifies the user of the necessity of relearning. For example, when the user selects a scheme of causing the model to track a normal state and the determination unit 332 determines that relearning is necessary, the user can select the relearning. When the determination unit 332 determines that the relearning is not necessary, the user can select the over-detection FB.

Hereinafter, conditions used for the determination unit 332 to determine the necessity of the relearning of the initial learning model will be described. The conditions broadly are classified onto (1) conditions for the over-detection data and (2) conditions for the initial learning model. The conditions may be used alone or in combination. For example, when any of the following conditions is satisfied, the determination unit 332 determines that the relearning is necessary.

(1) Conditions for Over-Detection Data

When the ratio of the number of cases of over-detection data to the number of cases of initial learning data exceeds a predetermined value, the determination unit 332 determines that relearning of the initial learning model is necessary. For example, when the number of pieces of over-detection data used for learning of the over-detection model exceeds 30% of the number of pieces of initial learning data, the determination unit 332 determines that the relearning of the initial learning model is necessary.

This is because corrects a small deviation from the initial learning is corrected through the over-detection FB in the first place, and the over-detection FB does not function well when an excessively large amount of over-detection data is subjected to FB.

The determination unit 332 determines that the relearning of the initial learning model is necessary when a ratio of the number of types of over-detection data in classification of the over-detection data into the plurality of types based on a predetermined standard to the number of types in classification of the initial learning data based on the predetermined standard exceeds a predetermined value. For example, when target data is information of each packet or each flow generated in communication, the types may be based on a difference in a communication protocol, a port number, or the like.

For example, when communication based on a communication protocol that is not present in learning of the initial learning model increases, there is a possibility of a traffic tendency being greatly changed, and it is conceivable that the relearning of the initial learning model is necessary.

When the loss function of the over-detection model exceeds a predetermined value, the determination unit 332 determines that the relearning of the initial learning model is necessary. This means that the loss function of the over-detection model cannot be made sufficiently small only with the over-detection data, and therefore quality of the over-detection model is not improved. In this case, it is conceivable that the relearning of the initial learning model is required.

(2) Conditions for Initial Learning Model

The determination unit 332 determines that the relearning of the initial learning model is necessary when a ratio of data that is not detected as an abnormality by the abnormality detection system using the over-detection model among the detection target data exceeds a predetermined value. For example, when the number of pieces of data determined to be normal by the over-detection model exceeds 40% of the number of pieces of detection target data, it is determined that the relearning of the initial learning model is necessary.

The data determined to be normal is, for example, data that has a low anomaly score and is not detected to be abnormal. This is because it is conceivable that the number of data more appropriate for the over-detection model than the initial learning model increases.

When the anomaly score indicating the degree of abnormality calculated by the initial learning model exceeds a predetermined value, the determination unit 332 determines that the relearning of the initial learning model is necessary. This is because it is conceivable that a tendency of normal data changes, and the initial learning model calculates a high anomaly score even for the data that is originally normal.

The determination unit 332 may determine the conditions for the initial learning model, for example, every certain period. For example, the determination unit 332 determines the conditions based on data for the latest 4 hours.

[Processing of First Embodiment]

Figure 5:
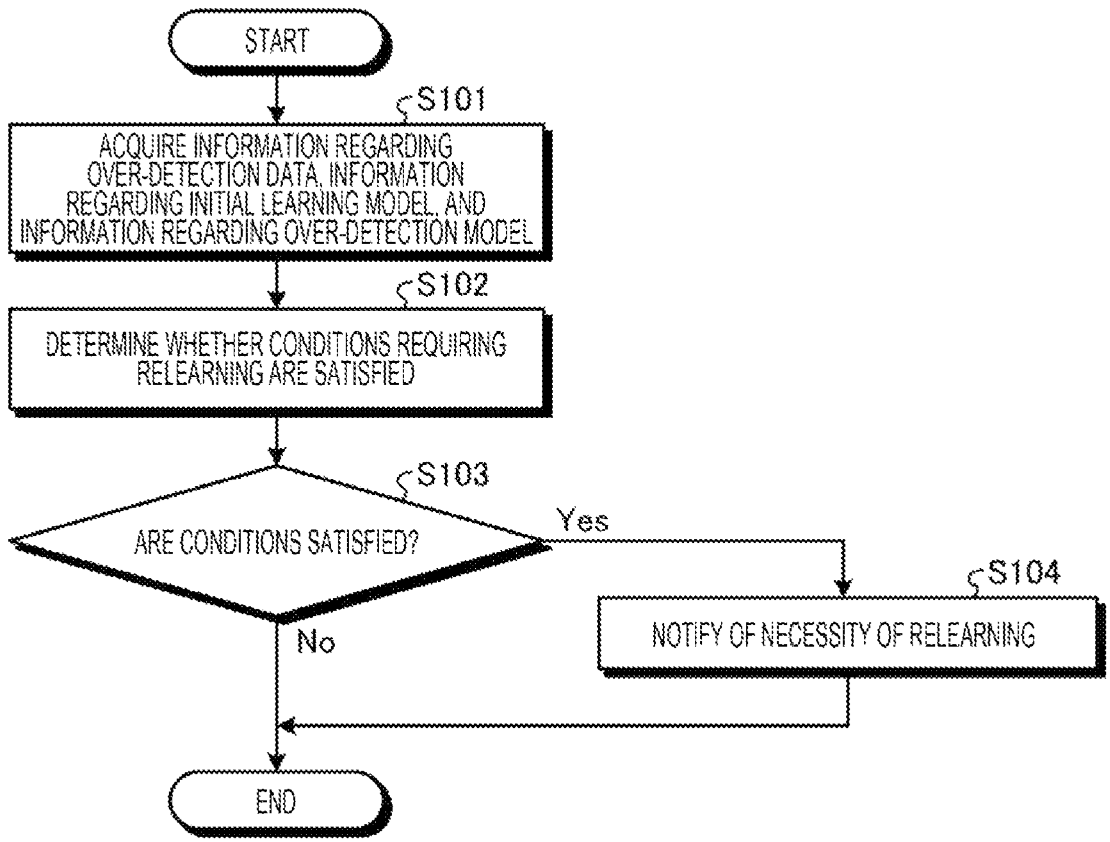
FIG. 5 is a flowchart illustrating a flow of processing of the determination device according to the first embodiment.

FIG. 5 is a flowchart illustrating a flow of processing of the determination device according to the first embodiment. First, the determination device 30 acquires information regarding the over-detection data, information regarding the initial learning model, and information regarding the over-detection model (step S101). The determination device 30 may acquire some or all of these pieces of information.

Subsequently, the determination device 30 determines whether conditions requiring the relearning are satisfied based on the acquired information (step S102). When the conditions are satisfied (Yes in step S103), the determination device 30 notifies of necessity of the relearning (step S104). When the conditions are not satisfied (No in step S103), the determination device 30 ends the process without notifying of the necessity of the relearning.

[Advantageous Effects of First Embodiment]

As described above, the determination unit 332 determines the necessity of relearning of the initial learning model based on at least one of the information regarding the initial learning model generated by learning the initial learning data known to be normal, the information regarding the over-detection data over-detected by the abnormality detection system using the initial learning model, and the information regarding the over-detection model generated based on the over-detection data. The notification unit 333 notifies of a determination result of the determination unit 332. In this way, the determination device 30 automatically determines and notifies of the necessity of the relearning. As a result, according to the present embodiment, it is possible to appropriately select a scheme of tracking a change in a normal state.

When the ratio of the number of cases of over-detection data to the number of cases of initial learning data exceeds a predetermined value, the determination unit 332 determines that relearning of the initial learning model is necessary. Accordingly, it is possible to prevent a large amount of over-detection data from being subjected to FB and prevent the over-detection model from not functioning.

When the ratio of the number of types of over-detection data in classification of the over-detection data into the plurality of types based on the predetermined standard to the number of types in classification of the initial learning data based on the standard exceeds the predetermined value, the determination unit 332 determines that the relearning of the initial learning model is necessary. Accordingly, it is possible to sense that the tendency of the data considerably changes and accuracy of the initial learning model has relatively decreased.

When the loss function of the over-detection model exceeds a predetermined value, the determination unit 332 determines that the relearning of the initial learning model is necessary. Accordingly, it is possible to sense that the quality of the over-detection model is not improved.

The determination unit 332 determines that the relearning of the initial learning model is necessary when a ratio of data that is not detected as an abnormality by the abnormality detection system using the over-detection model among the detection target data exceeds a predetermined value. Accordingly, it is possible to sense that the tendency of the data has changed and the data has been appropriate for the over-detection model instead of the initial learning model.

When the score indicating the degree of abnormality calculated by the initial learning model exceeds the predetermined value, the determination unit 332 determines that the relearning of the initial learning model is necessary. Accordingly, it is possible to sense that the tendency of the data considerably changes and accuracy of the initial learning model has relatively decreased.

[Example]

The detection system 1 and the determination device 30 according to the present embodiment are applicable to abnormality detection of IoT devices. For example, the detection system 1 performs statistical processing on packets captured by a network sensor deployed in an IoT network and generates a traffic feature amount. Then, the detection system 1 learns a generation model (a probability density estimator) using the traffic feature amount and generates the initial learning model.

Further, the detection system 1 continues to perform the abnormality detection for a certain period using the initial learning model and accumulates the over-detection data. The determination device 30 acquires the accumulated over-detection data and information regarding each model from the detection system 1, determines whether the relearning is necessary, and recommends the relearning as necessary.

[System Configuration and the Like]

Each constituent of the devices illustrated in the drawing is functionally conceptual and may not be physically configured as illustrated in the drawing. That is, a specific form of distribution and integration of each device is not limited to the illustrated form. Some or all of the constituents may be functionally or physically distributed and integrated in any unit according to various loads, usage conditions, and the like. Further, all or any part of each processing function performed in each device can be enabled by a central processing unit (CPU) and a program analyzed and executed by the CPU, or can be enabled as hardware by a wired logic. The program may be executed not only by the CPU but also by another processor such as a GPU.

Of the processes described in the present embodiments, some or all of the processes automatically performed, as described, may be manually performed, or some or all of pieces of the processes manually performed, as described may be automatically performed in accordance with a known method. In addition, the processing procedure, the control procedure, the specific names, and the information including various kinds of data and parameters illustrated in the documents and the drawings can be freely changed unless otherwise specified.

[Program]

In an embodiment, the determination device 30 can be implemented by installing a determination program that executes the foregoing learning process as packaged software or online software in a desired computer. For example, by causing an information processing device to perform the determination program, the information processing device can be caused to function as the determination device 30. The information processing device mentioned here includes a desktop computer or a laptop computer. In addition to the computer, the information processing device also includes mobile communication terminals such as a smartphone, a mobile phone, and a personal handyphone system (PHS) and further includes a slate terminal such as a personal digital assistant (PDA).

Furthermore, when a terminal device used by a user is implemented as a client, the determination device 30 can also be implemented as a determination server device that provides a service related to the determination processing to the client. For example, the determination server device is implemented as a server device that provides a determination service in which information regarding over-detection data is input and necessity of relearning is output. In this case, the determination server device may be implemented as a web server or may be implemented as a cloud that provides a service related to the determination process by outsourcing.

Figure 6:
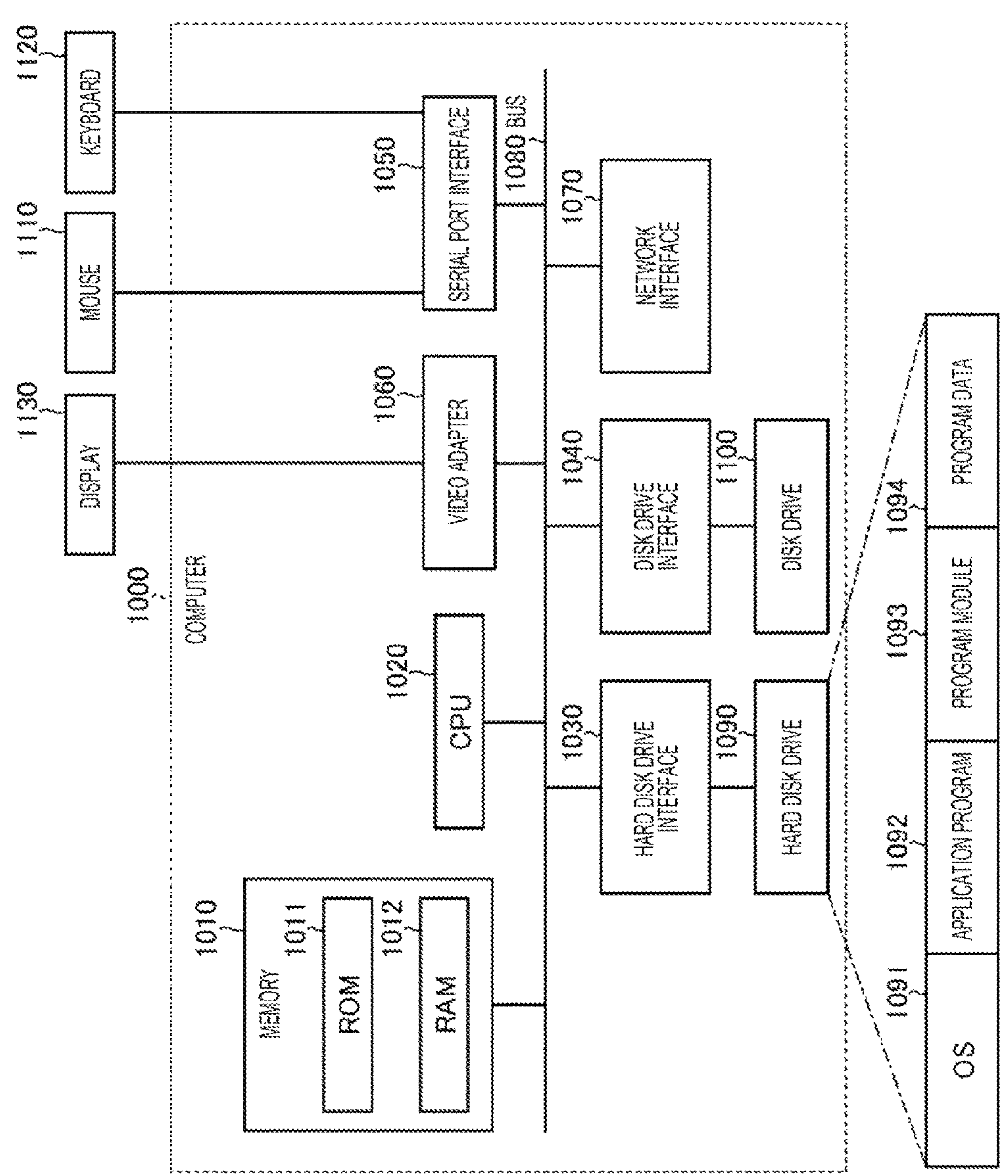
FIG. 6 is a diagram illustrating an example of a computer that executes a determination program.

FIG. 6 is a diagram illustrating an example of a computer that executes the determination program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected to each other by a bus 1080.

The memory 1010 includes a read-only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program that defines each processing of the determination device 30 is implemented as the program module 1093 in which a code which can be executed by the computer is described. The program module 1093 is stored in, for example, the hard disk drive 1090. For example, the program module 1093 executing similar processing to the functional configurations in the determination device 30 is stored in the hard disk drive 1090. The hard disk drive 1090 may be replaced with a solid state drive (SSD).

Setting data used in the processing of the above-described embodiments is stored as the program data 1094, for example, in the memory 1010 or the hard disk drive 1090. Then, the CPU 1020 reads, in the RAM 1012, the program module 1093 and the program data 1094 stored in the memory 1010 or the hard disk drive 1090, as needed, and executes the processing of the above-described embodiments.

The program module 1093 and the program data 1094 are not limited to the case in which the program module 1093 and the program data 1094 are stored in the hard disk drive 1090 and may be stored in, for example, a detachable storage medium and may be read by the CPU 1020 via the disk drive 1100 or the like. Alternatively, the program module 1093 and the program data 1094 may be stored in another computer connected via a network (a local area network (LAN), a wide area network (WAN), or the like). Then, the program module 1093 and the program data 1094 may be read by the CPU 1020 from another computer via the network interface 1070.

REFERENCE SIGNS LIST

1 Detection system
10 Training device
20 Detection device
30 Determination device
31 IF unit
32 Storage unit
33 Control unit
331 Acquisition unit
332 Determination unit
333 Notification unit

The invention claimed is:

1. A determination device comprising:
processing circuitry configured to:
determine necessity of relearning of a first model based at least on:
information regarding the first model,
the first model has been generated by learning initial learning data that represent a ground-truth normal state,
information regarding over-detection data that describe the ground-truth normal state incorrectly as an abnormal state as over-detected by an abnormality detection system using the first model,
the information regarding the over-detection data further describes a ratio of a first number of types to a second number of types exceeding a predetermined value,
the over-detection data have been classified into the first number of types describing one or more types of a plurality of types according to a predetermined standard,
the initial learning data that have been classified into the second number of types describing one or more types of the plurality of types according to the predetermined standard,
information regarding a second model, and
the second model has been generated by learning the over-detection data; and
create and present a result of the determined necessity, thereby causing relearning of the first model using the information regarding the over-detection data as relearning data to classify the ground-truth normal state with accuracy by tracking change of the ground-truth normal state.

2. The determination device according to claim 1, wherein the processing circuitry is further configured to determine that the relearning of the first model is necessary when a ratio of the number of pieces of the over-detection data to the number of pieces of the initial learning data exceeds a predetermined value.

3. The determination device according to claim 1, wherein the processing circuitry is further configured to determine that the relearning of the first model is necessary when a loss function of the second model exceeds a predetermined value.

4. The determination device according to claim 1, wherein the processing circuitry is further configured to determine that the relearning of the first model is necessary when a ratio of data in which an abnormality is not detected by the abnormality detection system using the second model among detection target data exceeds a predetermined value.

5. The determination device according to claim 1, wherein the processing circuitry is further configured to determine that the relearning of the first model is necessary when a score indicating a degree of abnormality calculated by the first model exceeds a predetermined value.

6. A determination method executed by a determination device, comprising:
determining necessity of relearning of a first model based at least on:
information regarding the first model,
the first model has been generated by learning initial learning data that represent a ground-truth normal state,
information regarding over-detection data that describe the ground-truth normal state incorrectly as an abnormal state as over-detected by an abnormality detection system using the first model,
the information regarding the over-detection data further describes a ratio of a first number of types to a second number of types exceeding a predetermined value,
the over-detection data have been classified into the first number of types describing one or more types of a plurality of types according to a predetermined standard,
the initial learning data that have been classified into the second number of types describing one or more types of the plurality of types according to the predetermined standard,
information regarding a second model, and
the second model has been generated by learning the over-detection data; and
creating and presenting a result of the determined necessity, thereby causing relearning of the first model using the information regarding the over-detection data as relearning data to classify the ground-truth normal state with accuracy by tracking change of the ground-truth normal state.

7. A non-transitory computer-readable recording medium storing therein a determination program that causes a computer to execute a process comprising:
determining necessity of relearning of a first model based at least on;
information regarding the first model,
the first model has been generated by learning initial learning data that represent a ground-truth normal state, information regarding over-detection data that describe the ground-truth normal state incorrectly as an abnormal state as over-detected by an abnormality detection system using the first model, the information regarding the over-detection data further describes a ratio of a first number of types to a second number of types exceeding a predetermined value, the over-detection data have been classified into the first number of types describing one or more types of a plurality of types according to a predetermined standard, the initial learning data that have been classified into the second number of types describing one or more types of the plurality of types according to the predetermined standard, information regarding a second model, and the second model has been generated by learning the over-detection data; and creating and presenting a result of the determined necessity, thereby causing relearning of the first model using the information regarding the over-detection data as relearning data to classify the ground-truth normal state with accuracy by tracking change of the ground-truth normal state.

* * * * *